April 10, 1956 — B. ELBERG — 2,741,082
CALENDAR TIMEPIECE
Filed Dec. 12, 1950 — 7 Sheets-Sheet 1

INVENTOR
Boris Elberg

April 10, 1956  B. ELBERG  2,741,082
CALENDAR TIMEPIECE

Filed Dec. 12, 1950  7 Sheets-Sheet 2

INVENTOR
Boris Elberg

April 10, 1956 B. ELBERG 2,741,082
CALENDAR TIMEPIECE

Filed Dec. 12, 1950 7 Sheets-Sheet 3

INVENTOR
Boris Elberg

April 10, 1956
B. ELBERG
2,741,082
CALENDAR TIMEPIECE
Filed Dec. 12, 1950
7 Sheets-Sheet 4
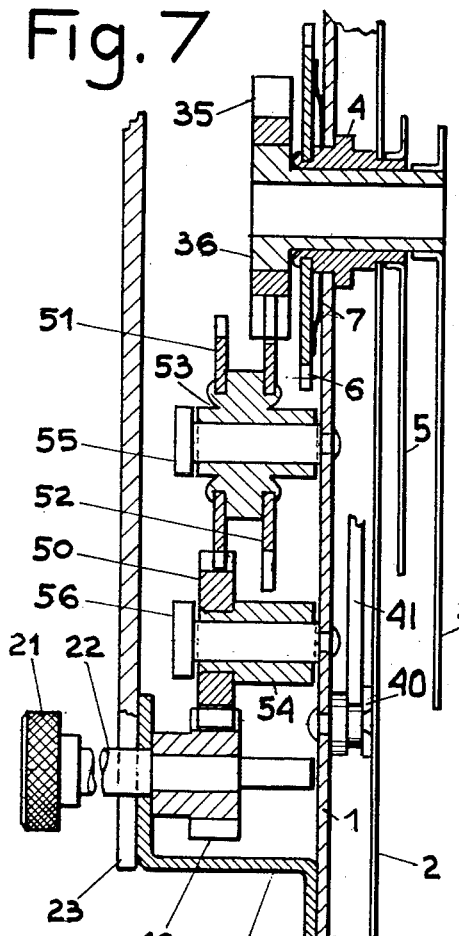
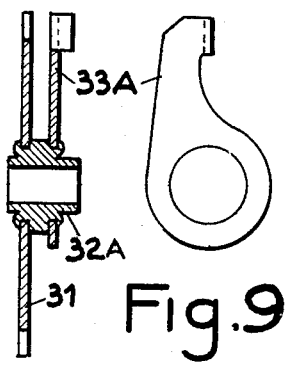
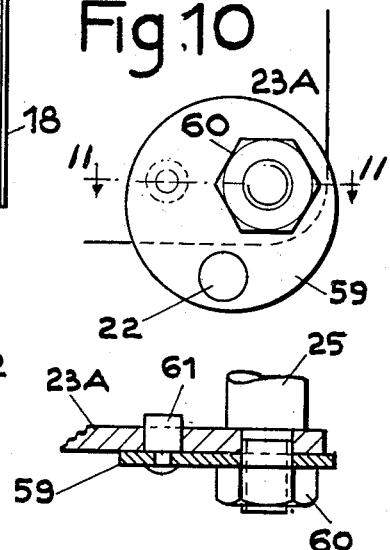
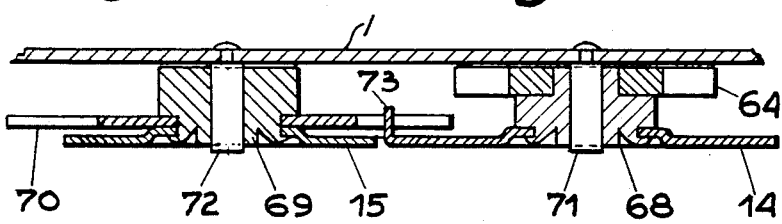
INVENTOR
Boris Elberg April 10, 1956     B. ELBERG     2,741,082
CALENDAR TIMEPIECE
Filed Dec. 12, 1950     7 Sheets-Sheet 5
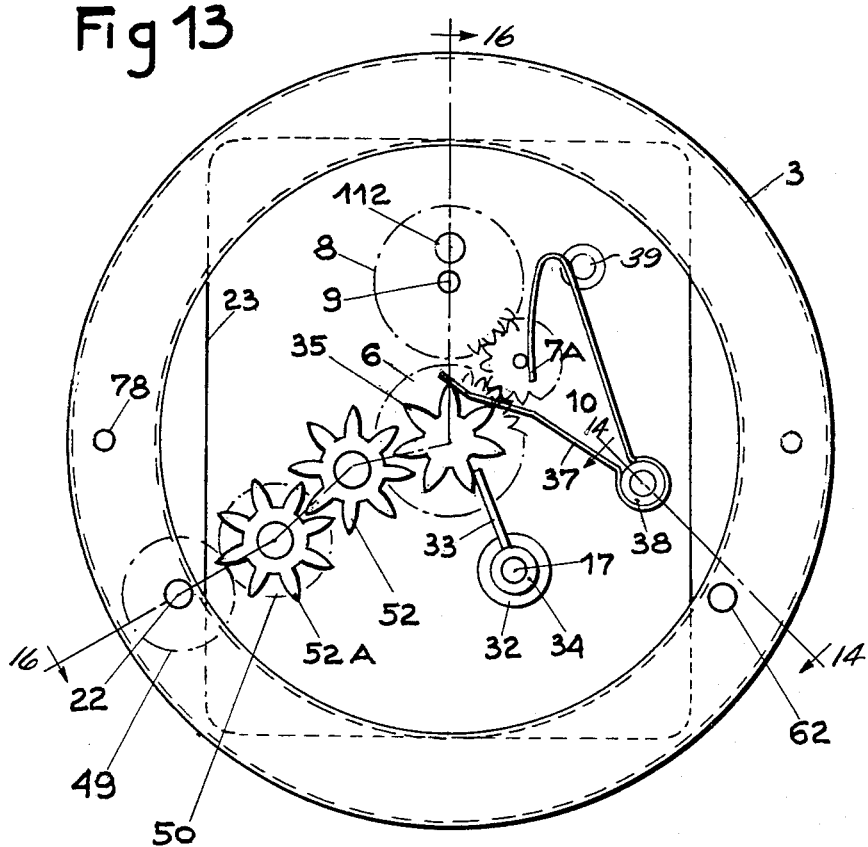
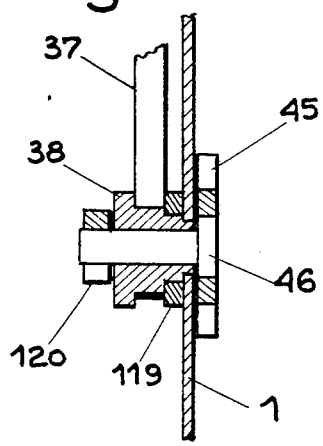
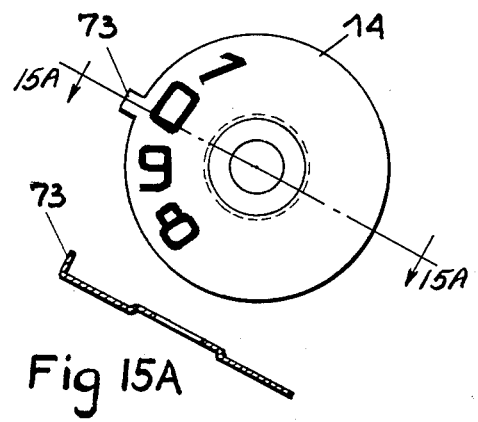
INVENTOR
Boris Elberg

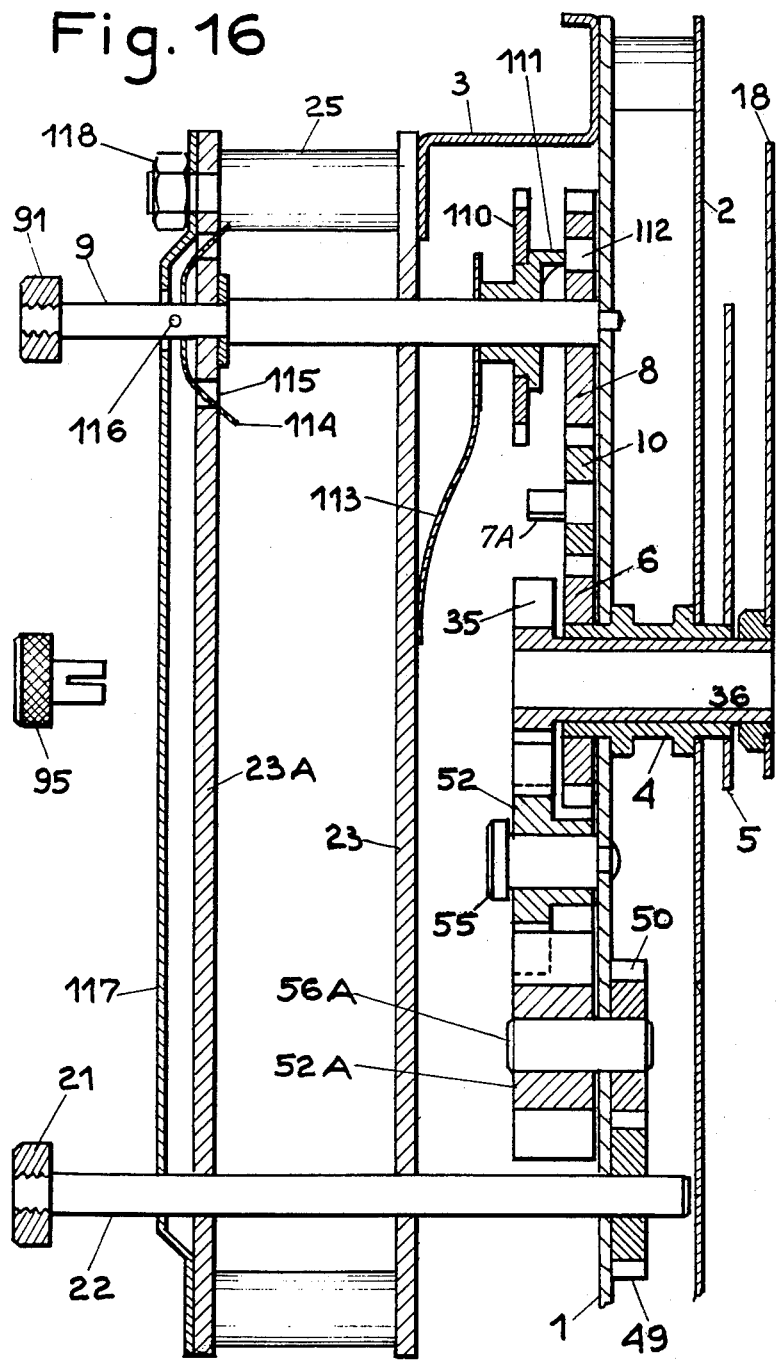

April 10, 1956 B. ELBERG 2,741,082
CALENDAR TIMEPIECE
Filed Dec. 12, 1950 7 Sheets-Sheet 7

INVENTOR
Boris Elberg

United States Patent Office 2,741,082
Patented Apr. 10, 1956

2,741,082

CALENDAR TIMEPIECE

Boris Elberg, Paris, France

Application December 12, 1950, Serial No. 200,360

1 Claim. (Cl. 58—5)

The present invention has for its object to provide practical production means devised to enable an easy transformation of existing timepieces, such as clocks and alarm clocks with their existing conventional external casings into timepieces with automatic calendar.

The main object of this invention is to provide a new practical utility and reliability for timepieces, such as clocks and alarm clocks with automatic calendar by means of a new and efficient combination of calendar indicating members for the automatic calendar devised to provide simultaneously a particularly improved visibility for both the date of the month and the day of the week, whereby the said improved visibility for these two main calendar indications is devised in conjunction with a maximum of visibility for all other conventional indications of these clocks and alarm clocks such as for the hours, the minutes and the graduations for the alarm dial and wherein the said new and efficient combination is a combination of a central hand for the days of the week located in the center of the timepiece dial or dial plate with two rotating ciphered dials of units and tens for the date showing the two figures of the date in two closely adjacent windows cut out in the dial plate and disposed in symmetry with a vertical line passing between the said windows and the center of the dial.

Another object of this invention is an embodiment of the automatic calendar as a self-contained unit of an extremely reduced practically negligeable thickness forming an independently assembled mounting plate also devised as a support for the clock's dial and which can be easily secured to the clock mechanisms of existing clocks and alarm clocks in lieu and place of their ordinary dial, thus enabling the use of the existing clock mechanisms and of the existing external casings of these clocks and alarm clocks.

A particular object of this invention is a particular embodiment including the two objects mentioned above as a self-contained unit of an automatic calendar having a central hand for the days of the week mounted on a central cannon rotating in the center of the clock's dial, the said central hand indicating the actual day of the week out of the seven days of the week printed in full lengths on the periphery of the hour figures on the clock's dial, mechanical means actuating this central hand in a step-by-step movement at increments and secured to the rear face of a mounting plate, the said mounting plate supporting the clock's dial, the said mechanism devised in a mechanical combination with two flat rotating ciphered dials forming a rotating dial of units and a rotating dial of tens indicating the two figures of the date in two reading windows cut out in the clock's dial, the said central cannon devised to be completely free of any central rotating calendar dial, the said only two rotating ciphered dials of the date disposed above or below of the said central cannon and symmetrically disposed in respect to a vertical line passing through the center of the clock's dial and mechanical means for step-by-step movements of these two ciphered dials disposed between a reduced space provided reserved between the said mounting plate and the clock's dial.

Another object of the present invention is a particular mechanism devised simultaneously to provide a free space on the dial of a conventional alarm clock for the said two closely adjacent reading windows of the date and to provide a technical possibility for a combination of a central hand for the days of the week with a central hand for alarm setting to improve the accuracy of the alarm setting by means of a gearing device enabling to replace both the conventional eccentered hand and dial for alarm setting by a central hand for alarm setting mounted in the center of the clock's dial.

A further important object of this invention is a device of manual adjustment for the two said rotating dials of the date and for the said central hand of the days of the week by means of two free and permanent toothed gearings including two rotating manual adjustment shafts extending respectively with a manual button for the dates and a manual button for the days of the week on the rear face of the clock's casing and wherein each of the two said permanent toothed gearings is devised between a pinion secured respectively to each of the two said manual adjustment shafts and a pinion secured respectively to the above said rotating units dial of the date and to the above said rotating central cannon bearing the above said central hand for the days of the week, whereby the said two pairs of gearing pinions are gearing together respectively through one and through several intermediate pinions wherewith the two said manual adjustment shafts are possibly located outside of the clock mechanism while not extending through the periphery of the clock's casing thus enabling to use ordinary existing clock mechanisms and ordinary existing clock casings.

All above said and further objects of this invention are applicable for clocks and alarm clocks of all kinds mechanical or electrical.

The above said objects and further useful combinations of parts of this invention are explained with the aid of the annexed drawings in which:

Fig. 7 is an enlarged sectional view of Fig. 4 along the line 7—7 showing a device of a manual adjustment for the days of the week.

Fig. 8 is a separate sectional view showing an embodiment of a cam actuating the central hand of the days of the week and secured to a toothed wheel.

Fig. 9 is a front elevation of the cam shown in Fig. 8 and embodied as a piece cut out of sheet metal.

Fig. 10 is a front elevation of an embodiment of a rear support for a shaft of manual adjusting means for the days of the week.

Fig. 11 is a sectional view along the line 11—11 of Fig. 10 explaining the embodiment shown in the last said figure.

Fig. 12 is a sectional view along the line 12—12 of Fig. 5 showing a driving connection for the two rotating dials of the date included a 8-toothed star wheel fixed to a rotating tens dial and having its teeth adapted for passage behind the rear face of a units dial.

Fig. 13 is a sectional view corresponding to a view taken along the line 4—4 of Fig. 2 showing a front elevation of a second embodiment of a calendar clock utilizing a central hand indicating the days of the week in a combination with a central alarm hand.

Fig. 14 is a sectional view of Fig. 13 along the line 14—14 showing a securing device for the single spring of the last said figure by means of a pillar secured to the rear face of a calendar mounting plate.

Fig. 15 is a front elevation of a rotating units dial of the date shown in its first production phase forming a one-piece sheet metal cut out and stamped member in which a single tooth on the periphery of this dial is prepared for a subsequent rearward bending.

Fig. 15A is a sectional vew along a line 15A—15A of Fig. 15 passing through the center and through the single tooth of the units dial and shown after the final phase of its production process wherein the said single tooth is bent at a right angle to the dial.

Fig. 16 is an enlarged sectional view of Fig. 13 along the line 16—16 showing a practical embodiment of the two devices of Fig. 13.

This invention is considering as a principle that in a calendar clock the most useful calendar indications are only the indications of the date of the month and of the day of the week and therefore it aims to provide for clocks and alarm clocks with automatic calendar a new and particularly efficient combination of calendar-indicating members by means of which the effort of vision necessary for a simultaneous visibility of the said two calendar indications is practically eliminated and the distance from which these two calendar indications are still visible is particularly increased.

Figure 1:
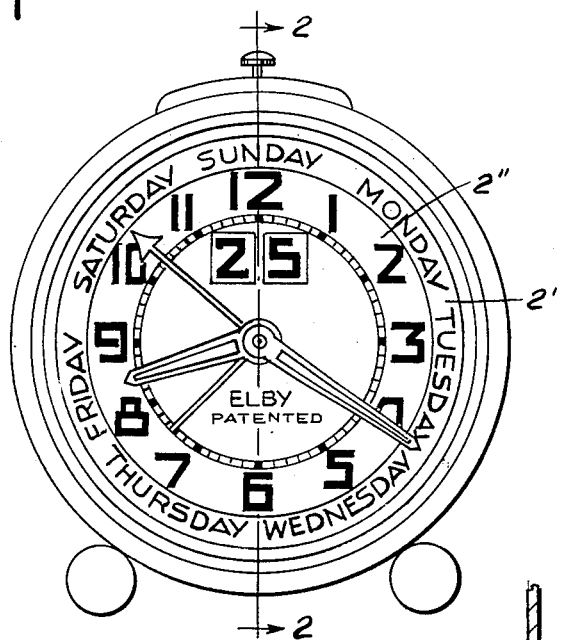
Fig. 1 is a front elevation of a conventional alarm clock with a conventional clock casing which is transformed into an alarm clock with automatic calendar according to the present invention.
Figure 2:
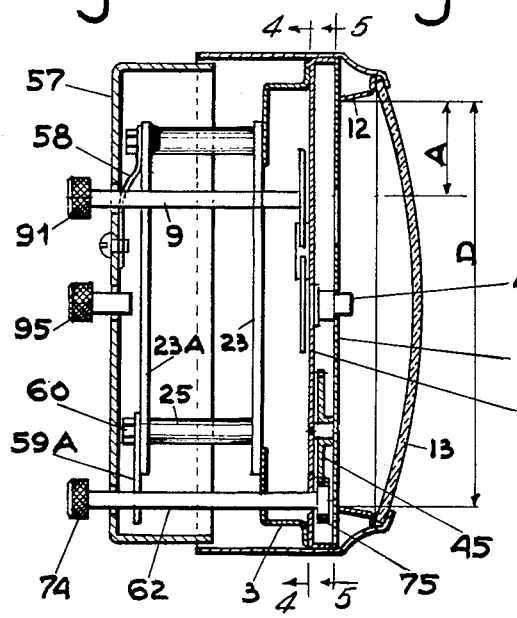
Fig. 2 is a sectional view of Fig. 1 along a vertical line 2—2 passing through the center of the alarm clock and showing a calendar self-contained unit secured to a clock mechanism.
Figure 5:
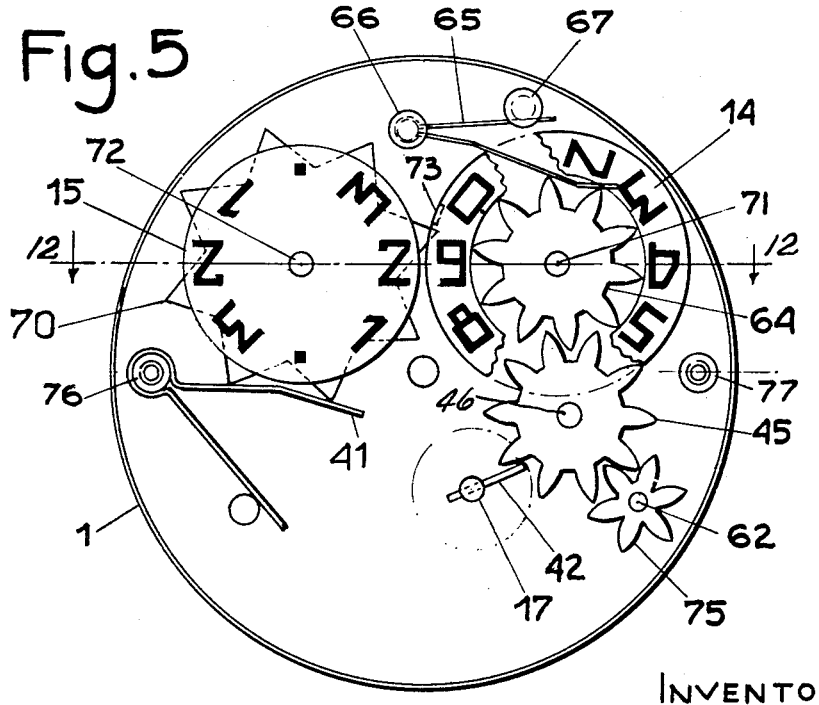
Fig. 5 is a sectional view of Fig. 2 along the line 5—5 showing a front elevation of a device of two rotating ciphered dials for the date.
Figure 18:
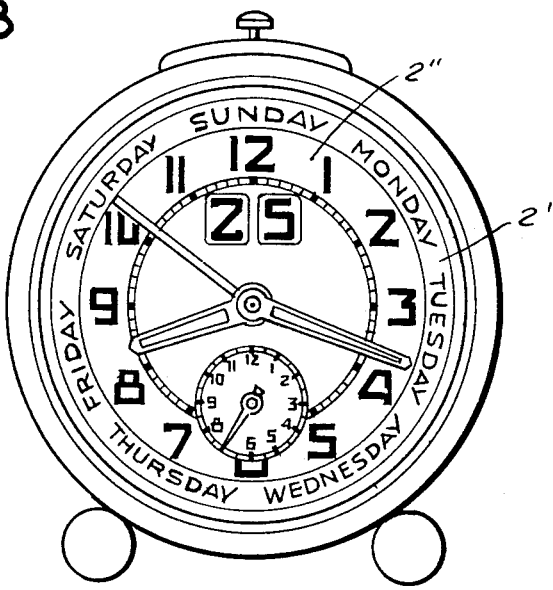
Fig. 18 is a front elevation of an alarm clock with automatic calendar according to the present invention in a combination with an eccentered hand for alarm setting located below the center of the clock's dial.

For these improvements of the visibility as best shown on Figs. 7 and 18 showing an alarm clock indicating Saturday 25, the day indicia of the days of the week dial 2' are printed in full lengths on the periphery of the hour dial 2, Saturday is indicated by a central hand mounted in the center of the clock's dial, whereby the date 25 of the month is shown in two closely adjacent reading windows cut out in the clock's dial by means of two rotating ciphered dials 14 and 15 forming a rotating dial of units and a rotating dial of tens for the date as embodied on Fig. 5 and showing respectively the figure 5 of the units and the figure 2 of the tens in the said two windows as rotating closely behind the rear face of the clock's dial. As shown on Figures 1 and 18 the described two closely adjacent reading windows of the date are located above the center of the clock's dial and are particularly disposed to have a vertical line of symmetry passing between the two said windows and the center of the clock.

The simultaneous improvement of visibility for both the date and the day of the week attained by this combination of the calendar-indicating members is explained as follows.

A units days date dial 14 and a tens days date dial 15 are printed respectively only with the ciphers 1234567890 and –123 –123 needing respectively only 10 and 8 circumferential divisions offering a large visible space for each figure, whereas in other kinds of calendar clocks only a single disk of a large diameter bearing all the 31 dates on 31 circumferential divisions can offer only a very reduced visible space for the entire date whereby a lack of visibility is particularly accentuated for the dates composed of 2 figures.

Owing to these particularities in the calendar clocks of this kind the only disk of the date is of a large diameter mounted in the center of the clock providing only a single window of a reduced reading space, whereby this lack of visibility is generally taking place in conjunction with an unnecessary prejudiciable friction of this disk on the central shafts of the hands for the hours and for the minutes.

Figure 6:
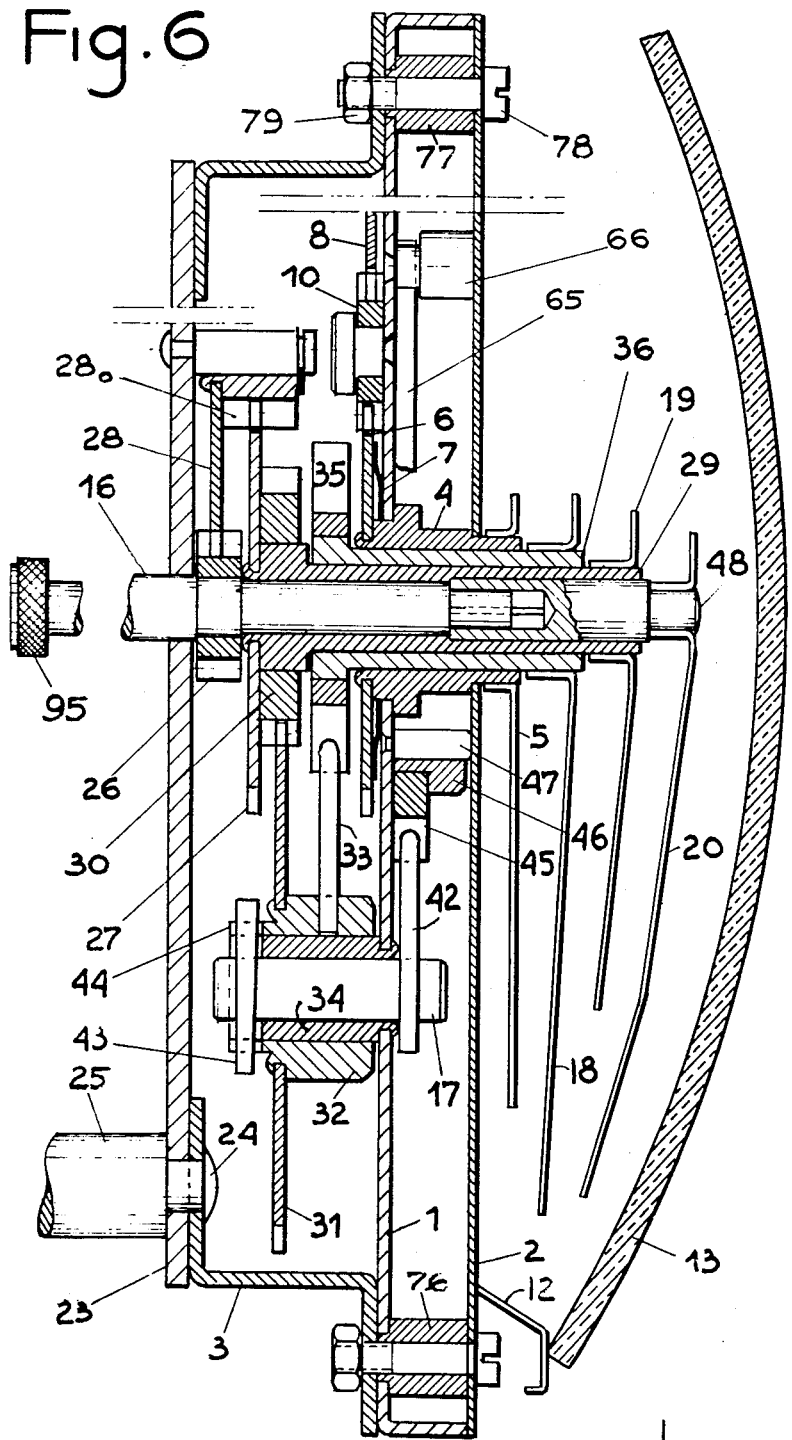
Fig. 6 is an enlarged sectional view along the line 6—6 of Fig. 4 passing through the center of the clock showing the central shafts bearing respectively the centrally mounted hands of the alarm setting, days of the week, hours and minutes while also showing a camwheel provided with a camshaft bearing two cams.

According to the present invention as best shown on Fig. 5 in conjunction with Fig. 1 no rotating calendar disk is mounted in the center of the clock, the 2 rotating dials of the date 14 and 15 are mounted on 2 independent pins 71 and 72 above the center of the clock and whereby this improved visibility of the date is devised in conjunction with an improved visibility of the day of the week for which the days of the week are printed in full lengths on the clock dial and the actual day of the week can be easily ascertained even from considerable distance by the angular position of a central hand for the days of the week mounted in the center of the clock's dial or dial plate 2 as best shown by the central hand 18 on Fig. 6 and 16.

Owing to the fact that the 7 subsequent angular positions of the central hand showing the day of the week are separated by 7 equal angles of a considerable amount having $\frac{1}{7}$ of 360° which means almost 52° for each of these angles, it follows that these 7 subsequent angular positions of this central hand are visible easily even from considerable distance which enables to ascertain the actual day of the week even without reading nor using the printed spellings of the days of the week.

The particular visibility of the central hand for the days of the week of which the angular position only is already indicating the actual day of the week even from considerable distance can be still more explained by the fact that even in a conventional clock using a central hand for a particular purpose (for instance a central hand of seconds) the visibility of the central hand is easily accentuated by a particular color of this hand in respect to the color of the clock's dial.

A particularly important advantage relating to the visibility of the date and attained by the combination of the two described reading windows for the date with the central hand for the days of the week is provided by the fact that owing to this combination the said central hand is never covering the said reading windows and even while in vertical position indicating Sunday the said central hand covers only the vertical separation between the two reading windows.

As best shown on Figures 1 and 18 in respect to the described vertical line of symmetry passing between the two windows of the date and reserved for Sunday the right side and the left side of the clock's dial are bearing respectively only three symmetrically disposed days of the week to correspond respectively only to three symmetrically disposed angular positions for the central hand of the days of the week wherewith the above disclosed visibility from distance of these particular angular positions in respect to the said two windows of the date is still more increased and wherewith the distance from which both the day of the week and the date of the month are still simultaneously and equally visible is increased to a particularly efficient maximum.

In a particular embodiment shown on Figs. 2, 5, 6 and 16 the automatic calender self-contained unit is assembled on a mounting plate 1 of round form devised as a support for the clock's dial 2 having the same diameter and secured to this plate for instance by two screws 78 and two distance pillars 76 and 77 as shown on Fig. 6.

The mounting plate 1 is provided with a central cannon 4 which while bearing a central hand 5 for alarm setting is also devised to act as a bearing for a second central cannon 36 to which is secured a central hand 18 for the days of the week as best shown on Fig. 16.

The timepiece shown in Fig. 1 is shown as an alarm clock and is embodied with a central hand for alarm setting mounted in the center of the clock's dial the initial timepiece mechanism used for this embodiment is a conventional alarm clock mechanism 23 having its manual shaft 9 for alarm setting with button 91 mounted above the center of the clock as best shown on Figs. 2, 13 and 16.

Figure 17:
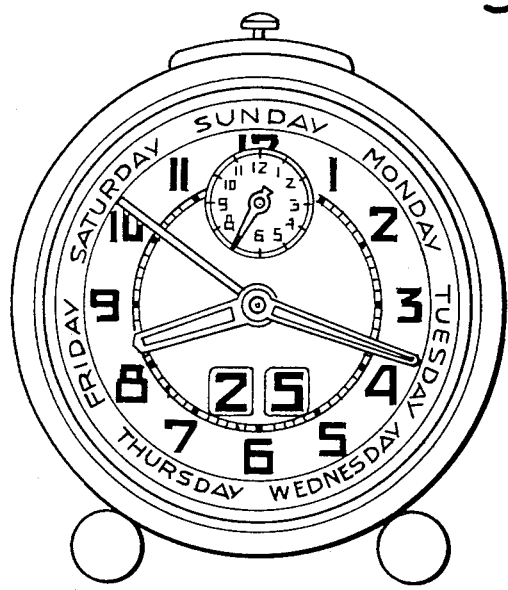
Fig. 17 is a front elevation of an alarm clock with automatic calendar according to the present invention in a combination with an eccentered hand for alarm setting located above the center of the clock's dial.

In conventional ordinary alarm clocks this eccentered manual shaft 9 for alarm setting bearing a conventional toothed wheel 110 provided with a conventional alarm cam 111 as shown on Fig. 16 is mounted directly with an eccentered hand for alarm setting needing an auxiliary alarm dial with hours from 1 to 12 and a corresponding space for it above the center of the clock dial as best shown on Fig. 17, this space is devised in Fig. 1 as a best place for the 2 reading windows of the date by means of a gearing device enabling to eliminate the said auxiliary alarm dial and to replace the said eccentered alarm hand by a central hand 5 for alarm setting mounted in the center of the clock dial 2 as best shown on Fig. 16.

This gearing device is practically embodied by means of a pinion 8 fixed to the forward end of the manual shaft 9 for alarm setting and gearing through an intermediate pinion 10 with an equal pinion 6 fixed to the rear end of the central cannon 4 mounted rotatably in the center of the mounting plate 1 and bearing the central hand 5 for alarm setting as best shown on Figs. 2, 13 and 16.

As best shown on Figures 16 and 6 the combination of this gearing device with the above described conventional toothed wheel 110 provided with the said conventional alarm cam 111 which under pressure of a conventional release spring 113 starting a conventional ringing device of the alarm clock mechanism 23 is bearing against a conventional manually adjustable cam-guiding member 112 fixed to the forward end of the described manual shaft 9 of the alarm setting is completely eliminating all possible contact and all possible pressure of the hours wheel 27 against the rear face of the central cannon pinion 6 bearing the central hand 5 for alarm setting thus effectively providing a free space between the said hours wheel 27 and the said central cannon pinion 6 for locating of a central cannon pinion 35 for a central hand 18 of the days of the week as best shown on Fig. 6 wherewith providing the technical possibility for the simultaneous conjunction of a central hand for the days of the week with a central hand for alarm setting.

As shown on Fig. 16 a rear friction spring 114 disposed on the described manual shaft 9 of the alarm setting and located in two openings 115 of the clock mechanism's rear plate 23A while maintained by a pin 116 fixed to the said manual shaft 9 of the alarm setting is provided to normally keep this manual shaft stationary.

Figure 3:
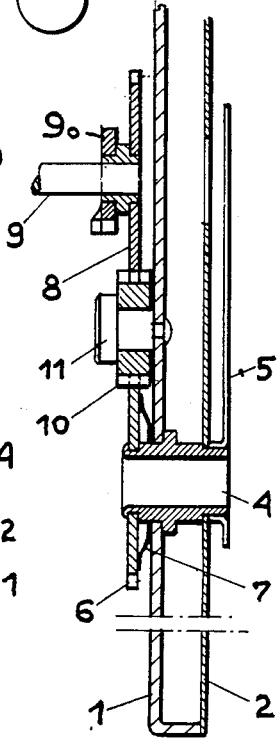
Fig. 3 is an enlarged sectional view along line 2—2 of Fig. 1 and showing only a gearing device devised to replace an initially eccentered hand for alarm setting by a central hand for alarm setting mounted in the center of the dial of the alarm clock.
Figure 4:
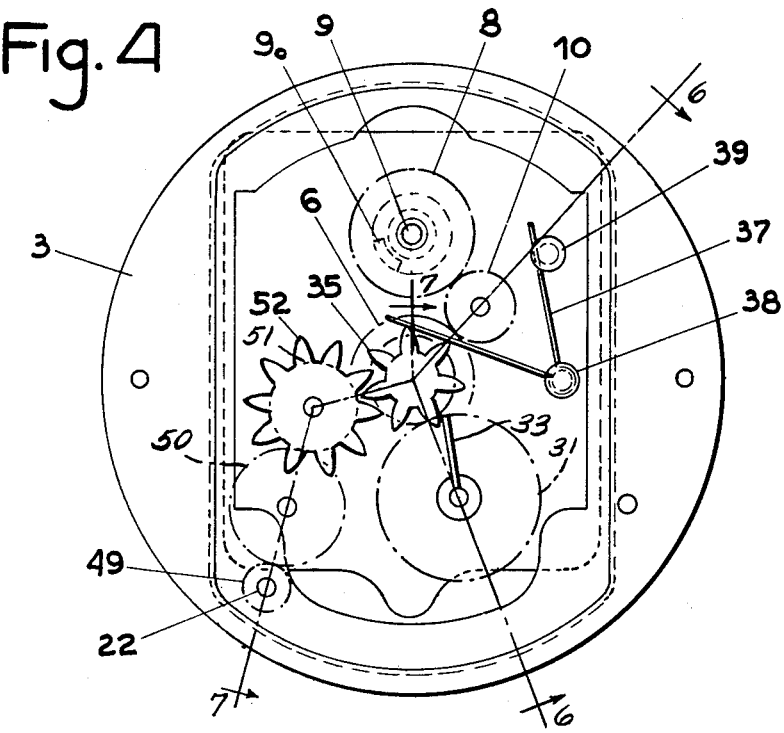
Fig. 4 is a sectional view of Fig. 2 along the line 4—4 showing a front elevation of a device of a central hand for the days of the week in conjunction with a device of a central hand for alarm setting.

As also shown in Fig. 3 a cam-guiding member 90 together with a manual pinion 8 for alarm setting which is equal to the described central cannon pinion 6 of the alarm setting are fixed to the forward end of the described manual shaft 9 of the alarm setting in order to cooperate with the alarm camwheel 110—111 as described with the aid of Fig. 16.

Whereas in Figures 3, 6 and 7 a spring 7 completing the described gearing device of the alarm setting is embodied as a central friction spring disposed on the described central cannon pinion 6 of the alarm setting, a preferred and particularly efficient embodiment of a spring 7A completing the said gearing device is best shown in Figures 13 and 16.

A particularly improved accuracy and an exact angular position of the central hand 5 for alarm setting in respect to the manual shaft 9 of the alarm setting is provided by means of a spring 7A pressing simultaneously the teeth of the intermediate pinion 10 against the teeth of the two equal pinions 6 and 8 in order to eliminate all possible clearance in the toothed gearing between the said two equal pinions 6 and 8 thus achieving an improved accuracy for this toothed gearing and therefore achieving a particularly improved accuracy for the described device of the central hand 5 for the alarm setting.

As for the particular embodiment shown on Fig. 1 a conventional alarm clock could have only an auxiliary eccentered alarm dial of a reduced visibility for the alarm setting, it follows that the above described gearing device is also resulting in an improved visibility and in an improved accuracy for the alarm setting by means of a central hand 5 for alarm setting of an increased length on a central graduated circumference of an increased diameter, whereby these improvements are attained in conjunction with the simultaneously improved visibility of the date and of the day of the week as described above.

As best shown on Fig. 2 in an existing conventional alarm clock having a diameter D provided for the clock casing's distance ring 12 limiting the visibility of the clock's dial 2 by the said diameter, the distance A available between the manual shaft 9 of the alarm setting and the said distance ring 12 for locating of an eccentered auxiliary dial for alarm setting shown on Fig. 17 is already too small even to achieve the figure 12 of the hours to be visible entirely so as in an existing alarm clock casing of a standard size a space for locating of a circle of seven days of the week is practically not available, whereby while locating the two windows of the date on a space opposite to the said eccentered alarm dial as shown on Figures 17 and 18 a space for locating of the alarm clock's trademark is also not available.

As best shown on Fig. 1 the described and effectively provided new and efficient combination of a central hand for the day of the week cooperating with a central hand for alarm setting besides being devised to achieve both the day of the week and the alarm setting simultaneously and equally visible and accurate is simultaneously also devised to provide a free space for locating of a circle of seven days of the week, a free space for locating of two windows for the date and a free space for locating of a trademark.

The central cannon or shaft 36 bearing the central hand 18 of the days of the week is fixed to a central pinion 35 having 7 equidistant teeth of a pointed ogival teeth profile and rotating in the central cannon 4, whereby this pinion is normally kept stationary in each of its 7 subsequent angular positions by means of a spring 37 bearing against the pointed of two subsequent teeth of this pinion and secured on the rear face of the mounting plate 1 by means of 2 pillars 38 and 39 as best shown in Figs. 4, 13, 14 and 16.

A toothed wheel 31 driven by the clock mechanism and provided with a camshaft 17 bearing a cam 33 is rotating on a hollow shaft 34 secured to the rear face of the mounting plate 1 and every 24 hours, while cooperating with the described spring 37 of the central 7-toothed pinion 35, the said cam and spring are driving this central 7-toothed pinion in a step-by-step movement at increments of $\frac{1}{7}$ of a revolution so as to bring the central hand 18 to indicate the following day of the week as best shown in Figures 6 and 13.

A particularly economical embodiment of the two above described springs 37 and 7A is shown on Fig. 13 in which these two springs are made as a one-piece member performing simultaneously the two described functions.

The two above described mechanisms of the days of the week and of the gearing device transferring an eccentered hand for alarm setting into the center of the clock's dial are disposed on the rear face of the mounting plate 1 so as when this plate is secured to the forward face of a dial support 3 fixed to a conventional clock mechanism 23, these two mechanisms are lodged within the space provided between the forward face of the said dial support 3 and the forward face of the clock mechanism 23 as shown on Fig. 6 from which it is apparent that an additional space needed for the automatic calendar is a reduced space reserved between the mounting plate 1 and the clock dial 2 for the mechanism of the two rotating dials of the date.

The dial 14 of the units of the date is fixed to a 10-toothed units pinion 64 rotating on a pin 71 fixed to the forward face of the mounting plate 1 and gearing with an intermediate pinion 45 also disposed on the forward face of this mounting plate as shown on Figures 5 and 12, whereby for reasons of economy the above described pillar 38 fixed to the rear face of the mounting plate 1 is disposed in the center of the intermediate pinion 45 and is bearing this intermediate pinion, for instance by means of a shaft 46 fixed thereto and rotating in the said pillar 38 as shown on Fig. 14 and whereby this pillar 38 is simultaneously adapted to bear the above described spring 37 of the central 7-toothed pinion 35 as shown in the front view of Fig. 13.

For reasons of economy the described intermediate pinion 45 can be embodied as a 10-toothed pinion equal to the units pinion 64.

As shown on Fig. 6 a cam 42, devised to actuate the described intermediate pinion 45 and fixed to the forward end of the described camshaft 17 rotating in a support 34 fixed to the rear face of the mounting plate 1, is fixed to the described toothed wheel 31 by means of a pin 43 securing the camshaft 17 to a hub 32 fixed to the wheel 31.

The object of this device is to provide a toothed wheel 31 mounted rotatably on the rear face of the mounting plate 1 and fixed to two cams 33 and 42 of which a rear cam 33 disposed on the rear face of the mounting plate 1 is actuating the central 7-toothed pinion 35 of the days of the week and a forward cam 42 disposed on the forward face of the mounting plate 1 is actuating the 10-toothed pinion 64 fixed to the rotating dial 14 of the units of the date directly or through an intermediate pinion 45 as shown on Fig. 5, so as when the assembled calendar unit is secured to the dial support 3 as shown on Fig. 6 the said wheel 31 becomes geared with a commanding pinion 30 fixed to the central hollow shaft 29 bearing the hand 19 of the hours, whereby this gearing is devised for instance in a ratio of 1:2 enabling the wheel 31 to rotate with a speed of 1 revolution in 24 hours and the two cams 33 and 42 to actuate respectively the central hand 18 of the days of the week and the rotating dial 14 of the units of the date every 24 hours.

As shown on Figs. 5 and 12 the rotating dial 15 of the tens of the date bearing two series of figures—1 2 3 disposed on 8 equal circumferential divisions of this dial is fixed to an 8-toothed star wheel 70 by means of a hub 69 rotating on a pin 72 fixed to the forward face of the mounting plate 1, whereby the two rotating dials 14 and 15 of the date are kept stationary in adequate positions showing their figures in the two respective windows closely adjacent of the clock's dial by means of two springs 65 and 41 bearing respectively against the 10-toothed pinion 64 and against the 8-toothed star wheel 70 as shown on Fig. 5.

The spring 65 shown in Fig. 5 is secured on the forward face of the mounting plate 1 by means of two pins 66 and 67 shown also on Fig. 6, whereby these pins as well as the above described pins 71 and 72 are devised simultaneously as distance pillars between the mounting plate 1 and the clock dial 2 in the same way as the two distance pillars 76 and 77 described above, and the tens-spring 41 is secured to the said pillar 76 as shown in Fig. 5.

Every 24 hours the rotating forward cam 42 cooperating with the spring 65 is driving the 10-toothed pinion 64 with the said units dial 14 fixed thereto in a step-by-step movement at increments of $\frac{1}{10}$ of a revolution thus causing the dial 14 of the units to indicate the following figure of the units in the corresponding units window of the clock's dial.

The rotating units dial 14 of the date is made as a one-piece sheet metal cut out and stamped member having a single-tooth 73 forming a rearward bending disposed between the figures 9 and 0 as best shown on Fig. 15 so that during each rotation of this dial from 9 to 0 the single tooth 73 is driving the 8-toothed star wheel 70 which cooperating with the tens-spring 41 is driving the rotating tens dial 15 of the date in a step-by-step movement of $\frac{1}{8}$ of a revolution thus indicating the following figure of the tens of the date in the corresponding tens window of the date on the clock dial.

As best shown in the Figures 5 and 12 the single tooth 73 on the periphery of the units dial 14 is forming rearward projection on the rear face of this units dial and this single tooth 73 is diametrally limited by a completely round periphery provided for the forward face of the said units dial 14, whereby a completely available forward face and a completely continuous periphery are provided for the tens dial 15, the teeth of the described 8-toothed star wheel 70 projecting beyond the periphery of the tens dial 15 are adapted for passage behind the rear face of the units dial 14 wherewith, as best shown on Fig. 5, for a clock casing C of a given size, the entire diameter of the units dial 14 with a maximum of available space on this dial is provided for printing of the units figures of the date thus increasing the size and therefore increasing the visibility for the units figures of the date while owing to the only 8 circumferential divisions of the tens dial 15 the tens figures are easily increased to the said size of the units figures these increasing the visibility for all figures of the date.

A mechanism of a manual adjustment for the date shown on Figs. 2 and 5 is devised by means of a free and permanent toothed gearing provided between the rotating units dial 14 of the date and a manual adjustment shaft 62 extending with a manual button 74 on the outer rear cover 57 of the clock's casing to which effect a pinion 75 secured to the manual shaft 62 is gearing with the 10-toothed pinion 64 fixed to the units dial 14 of the date through the intermediate pinion 45.

As shown on Fig. 2 the manual shaft 62 is supported by the mounting plate 1 and by a rear support 59A secured to the rear plate 23A of the clock mechanism by the nut 60.

A mechanism of a manual adjustment for the day of the week as best shown on Figs. 13 and 16 is devised also by means of a free and permanent toothed gearing provided between the central 7-toothed pinion 35 bearing the central hand 18 of the days of the week and a manual adjustment shaft 22 extending with a manual button 21 on the rear face of the clock's casing to which effect the said gearing is composed of a double pinion fixed to a common shaft 56A rotating in the mounting plate 1 and of which one pinion 52A rotating on the rear face of this mounting plate is gearing with the central 7-toothed pinion 35 through an intermediate pinion 52 rotatably mounted on the rear face of the mounting plate 1 and the other pinion 50 rotating on the forward face of this mounting plate is gearing with a manual pinion 49 secured to the forward end of the manual shaft 22, whereby the two pinions 49 and 50 are using a free space available between the mounting plate 1 and the clock's dial 2. As shown on Fig. 16 the two pinions 50 and 52A composing the said double intermediate pinion are closely disposed respectively on the forward face and on the rear face of the mounting plate 1 to enable the rotation of this double pinion.

The rotating dial 15 of the tens of the date can be made also along the same production method as shown on Figs. 15 and 15A for the rotating dial 14 of the units and by means of which the tens dial 15 with its 8-toothed star wheel 70 of the date can be also embodied as a one piece sheet metal cut out and stamped member.

The two manual adjustment shafts 22 and 62 are rotating with their forward ends in the mounting plate 1 or in the dial support 3 as shown in Figs. 16 and 13 and are best rotating with their rear ends in an internal rear cover 117 secured to the rear plate 23A of the clock mechanism as shown on Fig. 16.

Whereas this invention is mainly concerned with the above described simultaneous improvement of visibility for both the day of the week and the date of the month by means of the described new and efficient combination of a central hand for the day of the week with two rotating ciphered dials of units and tens for the date to achieve both the day of the week and the date of the month simultaneously and equally visible and with a new and efficient combination of a central hand for the day of the week with a central hand for alarm setting to achieve both the day of the week and the alarm setting simultaneously and equally visible and accurate whereby providing a particularly efficient production facility by means of an independently assembled calendar self-contained unit enabling a transformation of existing conventional clocks and alarm clocks into clocks and alarm clocks with automatic calendar, the counting principle on which the automatic indication of the date is based has been set forth in my previous U. S. Patent No. 2,073,275 from March 9, 1937.

This principle is termed as a cycle of renewable counting of all numbers from 0 to 39 by the action of the clock mechanism in conjunction with a device of instantaneous manual adjustment of the date by means of which the numbers greater than 28, 29, 30 or 31 are instantaneously eliminated by a monthly adjustment which in case of neglect causes this mechanism to indicate the numbers 32, 33, 34 and so forth to provide a visual warning to have the date adjusted to avoid any erroneous date indications.

The practical embodiment of the alarm clock with automatic calendar shown on Fig. 18 has the same calendar unit as described above for Fig. 1 whereby for reasons of economy an eccentered hand for alarm setting is maintained with an auxiliary alarm dial disposed below the center of the clock's dial, whereas an embodiment shown on Fig. 17 this auxiliary alarm dial and the described two closely adjacent windows of the date are located respectively above and below of the center of the clock's dial.

As best shown on Figs. 2 and 6 the automatical calendar unit is completely inserted within a conventional existing clock casing to which effect instead of an ordinary flat glass generally used in ordinary clocks and maintained on the clock's dial by a conventional distance ring 12, a convex glass 13 extending out of the clock casing and including a new additional space in respect to the normal space of the said ordinary clock casing is provided to provide a space within this ordinary clock casing, additional to that provided for shafts 28 and 48 and the hour and minute hands 19 and 20 thereon for the described calendar unit whereby the two described manual adjustment shafts 22 of the two calendar indications are extending only on the rear cover 57 of the clock's casing thus enabling the use of ordinary existing clock casings.

What I claim is:

In a calendar timepiece having a centrally apertured dial plate, a timepiece mechanism, hours and minutes shafts and a day of the week shaft projecting through said central aperture, means driven by the mechanism for actuating said shafts at their respective rates, a day of the week dial having day indicia uniformly spaced therearound, an hour dial, said dials extending around the marginal periphery of the dial plate, a pair of closely adjacent windows disposed above the center of the dial plate symmetrically with respect to a vertical axis passing through said center, the windows being located within the area surrounded by said dials, an indicium of the day of the week dial also being disposed symmetrically with respect to said axis, a units days date dial and a tens days date dial rotatably mounted behind the dial plate for registry with said windows and driven by the timepiece mechanism, and means driven by the timepiece mechanism associated with the day of the week shaft for actuating same by unit increments corresponding to the spacing of the day of the week indicia around the dial, and a pointer arranged on the day of the week shaft to move into coincidence with said axis when registering said day of the week indicium.

References Cited in the file of this patent

UNITED STATES PATENTS

| 2,358,702 | Gomez | Sept. 19, 1944 |
| 2,483,775 | Klaris | Oct. 4, 1949 |

FOREIGN PATENTS

| 5,139 | Switzerland | June 19, 1892 |
| 645,871 | France | July 3, 1928 |